United States Patent [19]

Komatsu et al.

[11] Patent Number: 4,653,339

[45] Date of Patent: Mar. 31, 1987

[54] RACK-AND-PINION STEERING GEAR FOR A VEHICLE

[75] Inventors: Shinich Komatsu, Hatano; Seiji Uemura, Kanagawa; Koichi Komatsu, Atsugi, all of Japan

[73] Assignee: Atsugi Motor Parts Co., Ltd., Kanagawa, Japan

[21] Appl. No.: 674,861

[22] Filed: Nov. 26, 1984

[51] Int. Cl.⁴ .................. B62D 3/12; B62D 5/06; F16J 9/12
[52] U.S. Cl. .................. 74/422; 74/388 PS; 74/498; 92/136; 92/167; 92/193; 180/148; 277/188 R
[58] Field of Search .......... 180/79, 132, 148, 151, 180/160; 92/136, 167, 193; 74/388 PS, 422, 498; 277/188 R

[56] References Cited

U.S. PATENT DOCUMENTS

| | | | |
|---|---|---|---|
| 2,736,625 | 2/1956 | Naab | 92/193 |
| 2,847,868 | 8/1958 | Newman | 74/388 |
| 3,118,349 | 1/1964 | Combs | 91/404 |
| 3,605,602 | 9/1971 | Tyson et al. | 92/187 |
| 3,785,253 | 1/1974 | Sandau | 92/181 |
| 3,806,134 | 4/1974 | Schexnayder | 277/5 |
| 4,004,499 | 1/1977 | Beck | 92/257 |
| 4,261,251 | 4/1981 | Shepherd | 92/116 |
| 4,275,641 | 6/1981 | Kopp | 92/136 |
| 4,373,599 | 2/1983 | Walter et al. | 92/167 |
| 4,380,273 | 4/1983 | Walter | 180/132 |
| 4,479,400 | 10/1984 | Rieger | 74/498 |
| 4,527,465 | 7/1985 | Yoshida et al. | 92/136 |

Primary Examiner—Allan D. Herrmann
Attorney, Agent, or Firm—McAulay, Fields, Fisher, Goldstein & Nissen

[57] ABSTRACT

A rack-and-pinion steering gear structure for a vehicle including a rack housed within a cylinder driven by means of a pinion shaft, comprising: a bolt having a threaded portion screwed in a threaded hole formed in one end face of the rack and a shoulder linked integrally with the threaded portion and smaller in diameter than the rack but greater in diameter than the threaded portion; and a piston housed within a groove formed by the shoulder of the bolt, the seating surface of the bolt head, and the end face of the rack, with clearances with respect to the groove in the axial and radial directions.

20 Claims, 8 Drawing Figures

RACK-AND-PINION STEERING GEAR FOR A VEHICLE

BACKGROUND OF THE INVENTION

1. Field of the Invention

The present invention relates to a steering gear structure of the rack-and-pinion type used in a vehicle.

2. Description of the Prior Art

There is a steering gear of the rack-and-pinion type in which a piston is received within a rack cylinder and reciprocates within the oil-filled rack cylinder so as to move the rack via a pinion associated with a steering wheel according to the rotation of the steering wheel by an operator. A rack-and-pinion steering gear has been proposed in which the piston is elastically attached to one end of the rack in order to partition the rack cylinder into two chambers and to ensure the oil-tightness of the piston which slides smoothly within the rack cylinder by preventing misalignment between the piston and rack.

The above-described conventional steering gear structure of the rack-and-pinion type is exemplified by Japanese Patent Application No. 55-104,929 filed on July 30, 1980 and its unexamined Open No. 56-25058 published on March 10, 1981. The corresponding U.S. patent document is U.S. Pat. No. 4,380,273 to Walter filed on Aug. 1, 1980.

The system construction disclosed in the above-identified document will be described in detail hereinafter with reference to FIGS. 1 and 2 which are disclosed in the above-identified Japanese Application and U.S. Patent documents.

In FIGS. 1 and 2, numeral 1 denotes a pinion shaft rotatably disposed within a gear housing 2 and numeral 3 denotes a rack driven by the pinion shaft 1. In addition, numeral 4 denotes a boss projecting axially from the end face 3b of one end 3a of the rack 3 and having a smaller outer diameter $l_2$ than the outer diameter $l_1$ of the rack 3. Numeral 5 denotes a base ring fitted over the boss 4. Numeral 6 denotes a piston mounted on the radial periphery of the base ring 5. An annular projection 7 formed on the inner periphery 6a of the piston 6 is housed within an annular recess 8 formed in the outer periphery 5b of the base ring 5 with a desired clearance in the axial direction. An outer seal ring 11 and an elastic seal ring 12 are received in an outer seal groove 9 formed in the outer periphery 6b of the piston 6. The outer seal ring 11 serves to provide a liquid-tight seal structure between the cylinder 10 and piston 6. The elastic seal ring 12 is arranged inside of the outer seal ring 11. Numeral 13 denotes two elastic seal rings arranged side-by-side between the annular recess 8 of the base ring 5 and annular projection 7 of the piston. Finally, numeral 14 denotes a rivet-shaped bead formation retaining the base ring 5 on the rack 3.

Since in the rack-and-pinion steering gear structure of the construction described above the piston 6 is elastically installed in such a way that there is a clearance in the axial direction with respect to the end 3a of the rack 3 and the piston 6 is urged into elastic contact radially with the wall 10a of the rack cylinder 10 by the elastic seal rings 13, installation errors can be canceled by the play in the piston 6 should the piston 6, rack 3, and cylinder 10 not be accurately mounted coaxially. Consequently, the outer seal ring 11 will always elastically contact the inner periphery 10a of the cylinder 10 without clearance. Hence, the piston 6 partitions the cylinder 10 into the two operation chambers 15, 16 while providing a liquid-tight seal structure therebetween by means of the outer seal ring 11.

In addition, since the piston 6 slides along the inner periphery (or wall) 10a of the cylinder 10 even in the case where a part of or all of the rack 3 is bent or skewed, the piston 6 can smoothly reciprocate within the cylinder 10 without excessive pressure locally on any part of the inner periphery 10a of the cylinder.

However, there are drawbacks in the abovedescribed conventional steering gear structure in that since the base ring 5 must be interposed between the piston 6 and boss 4 and two elastic seal rings 13, 13 must be interposed between the base ring 5 and annular projection 7 of the piston 6, and furthermore the base ring 5 must then be mounted on the rack 3 and thereafter the tip of the boss 4 must be flared to hold it in place, it takes a long time and a high level of workmanship to assemble. In addition, since in order to mount the piston 6 with adequately small axial clearances, the steering gear must include the base ring 5 within which the annular projection 7 is inserted, the profiles and structures of the constituent parts are unavoidably complex and accordingly the cost of machining the parts and so the total cost of assembling the steering gear will be unnecessarily high.

SUMMARY OF THE INVENTION

In accordance with the present invention, it is an object of the present invention to provide a rack-and-pinion steering gear structure in which an annular piston can be attached to a rack with sufficient mechanical strength and the axial length of an annular groove receiving the piston can be fabricated very simply and with high accuracy.

The above-described object can be achieved by the rack-and-pinion steering gear structure in which a bolt having a shoulder between the head and the threaded portion is screwed into an end face of the rack so that an annular groove is defined by the shoulder of the bolt, the base surface of the bolt head, and the end face of the rack. The annular piston is elastically retained with this annular groove by the mechanical strength of the above-described bolt.

Furthermore, since the shoulder of the bolt is held in contact with the end face of the rack, the shoulder of the bolt determines the axial dimension of the annular groove by which the piston is retained. Consequently, the axial dimensional of the annular groove can quickly be set with high accuracy.

BRIEF DESCRIPTION OF THE DRAWINGS

A more complete understanding of the present invention may be obtained from the following detailed description taken in conjunction with the drawings in which like reference numerals designate corresponding elements and in which:

FIG. 4 is an exploded view of the piston and the major retaining elements of FIG. 3, in which:

FIG. 4(A) is a perspective view of the bolt shown in FIG. 3;

FIG. 4(B) is a perspective view of the piston shown in FIG. 3;

FIG. 4(C) is a partial view of the end of the rack shown in FIG. 3;

DETAILED DESCRIPTION OF THE PREFERRED EMBODIMENTS

Reference will hereinafter be made to the drawings in order to facilitate understanding of the present invention.

Figure 1:
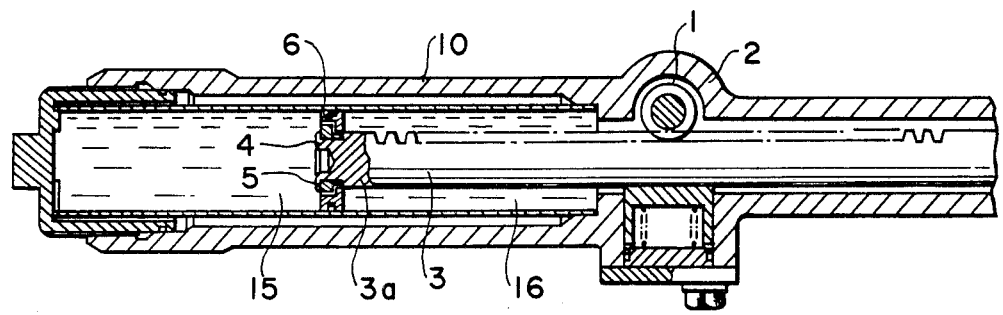
FIG. 1 is a longitudinal section of a rack-and-pinion steering gear structure disclosed in U.S. Pat. No. 4,380,273 to Walter.
Figure 2:
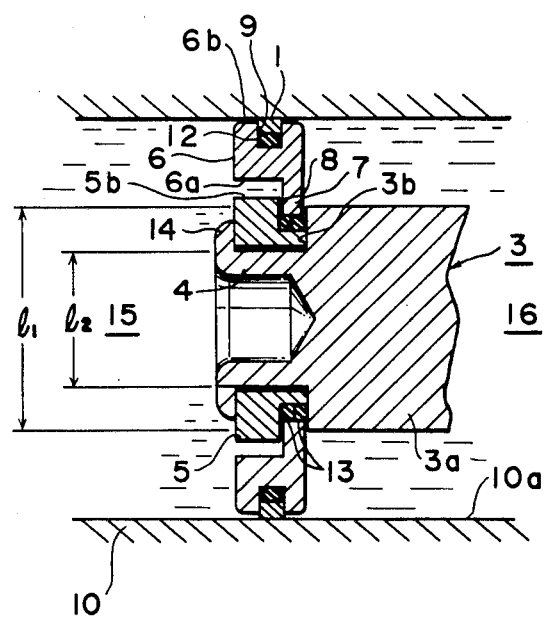
FIG. 2 is an enlargement of a crucial part of the piston shown in FIG. 1.
Figure 3:
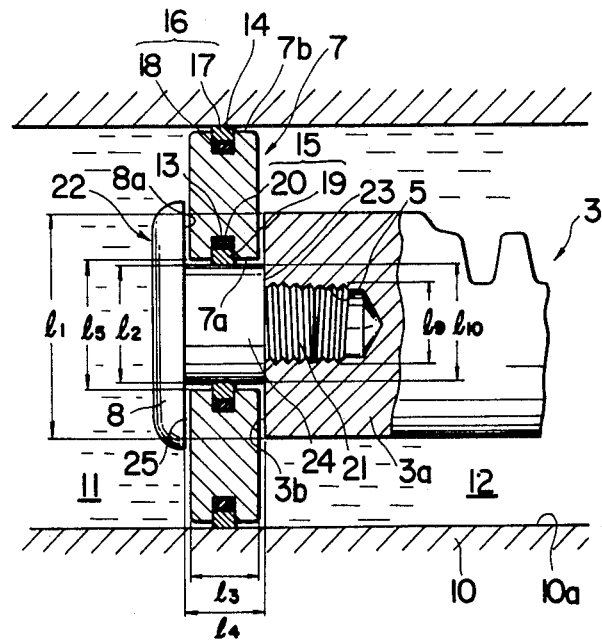
FIG. 3 is an enlarged view in partial section of a preferred embodiment of the rack-and-pinion steering gear structure according to the present invention.

FIG. 3 is shows the crucial part of a preferred embodiment of the rack-and-pinion steering gear structure according to the present invention.

FIGS. 4(A), (B), and (C) are perspective views of the major elements of the preferred embodiment shown in FIG. 3.

It is noted that the detailed structure of this conventional steering gear assembly is disclosed in U.S. Pat. No. 4,380,273 filed on Aug. 1, 1980 (Corresponding to JP. unexamined Open No. 56-25058), the contents of which are hereby incorporated by reference.

Figure 4:
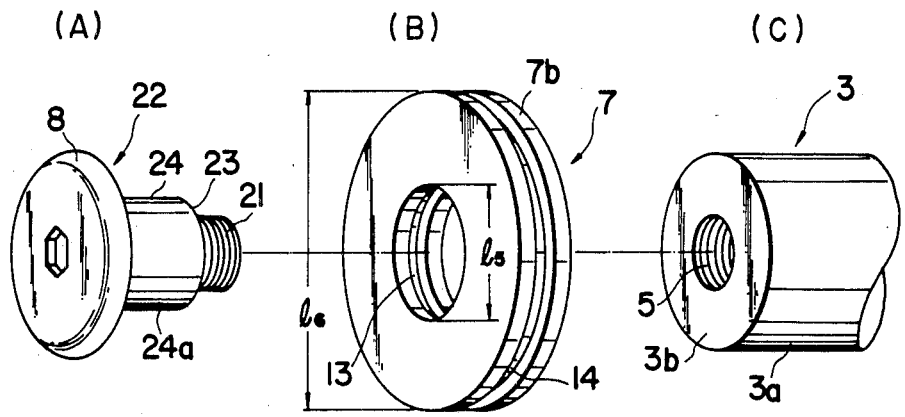

In FIGS. 3 and FIG. 4, numeral 22 denotes a bolt with a shoulder between the base or seating surface of its head and its threaded portion. In other words, the bolt 22 comprises three parts, i.e., a threaded portion 21 screwed into the threaded hole 5 formed in the end face 3b of the rack 3, a shoulder 24 integrally connected to the threaded portion 21 via a step 23 and having a diameter $l_{10}$ smaller than the diameter $l_1$ of the rack 3 and greater than the diameter $l_9$ of the threaded portion 21, and a flat-based head 8 integral to the shoulder 24. Numeral 25 denotes an annular groove defined by the shoulder 24 of the bolt 22 when screwed into the end 3a of the rack 3, the seating surface 8a of the bolt head 8, and the end surface 3b of the rack 3.

The annular piston 7 fits within the groove 25 with clearance in both the radial and axial directions. In this embodiment, the piston 7 has a constant axial dimension from the inner surface 7a to the outer surface 7b. An elastic annular sealing member 15 is interposed between the inner periphery 7a of the piston 7 and the shoulder 24 of the bolt 22. The annular sealing member 15 is retained by an annular sealing groove 13 formed in the inner periphery 7a of the piston 7. In this embodiment, the annular sealing member 15 comprises an inner sealing ring 19 in contact with the outer periphery 24a of the shoulder 24 of the bolt 22 and an elastic sealing ring 20 received within a recess in the piston 7 and surrounding the inner seal ring 19. Alternatively, as shown in FIG. 7, the annular sealing member 15 may be a single unit.

In the rack-and-pinion steering gear structure according to the present invention, the bolt 22 is screwed into the end face 3b of the rack 3 until the step 23 abuts the end face 3b of the rack so that the dimensions of the groove 25 are specified by those of the shoulder 24, thus obviating the need for such a boss formed in the end 3a of the rack 3, which would otherwise detract from the mechanical strength of the rack 3. Furthermore, this allows quick and highly accurate setting of the axial width $l_4$ in which the piston 7 is received.

Figure 5:
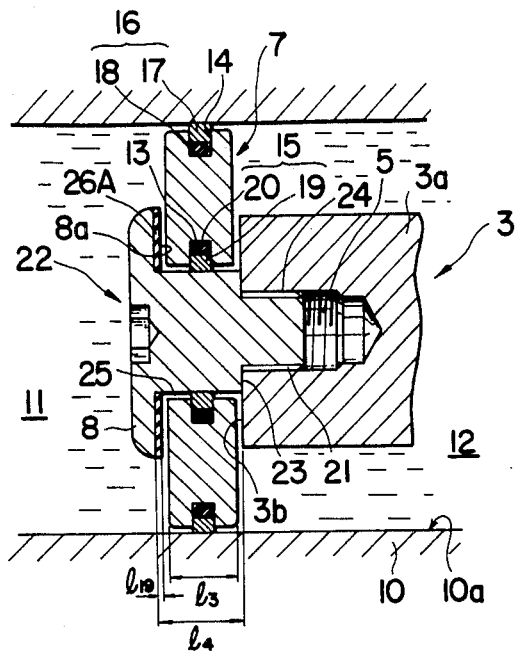
FIGS. 5, 6, and 7 are sectional views showing examples of different mechanical adjustments to the clearances in the annular groove shown in FIG. 3.
Figure 6:
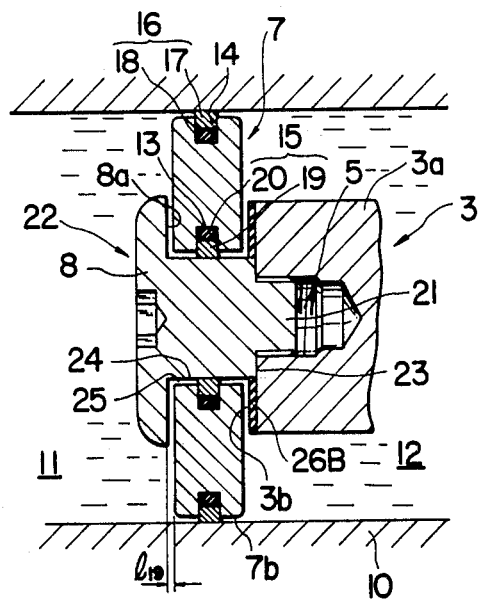
Figure 7:
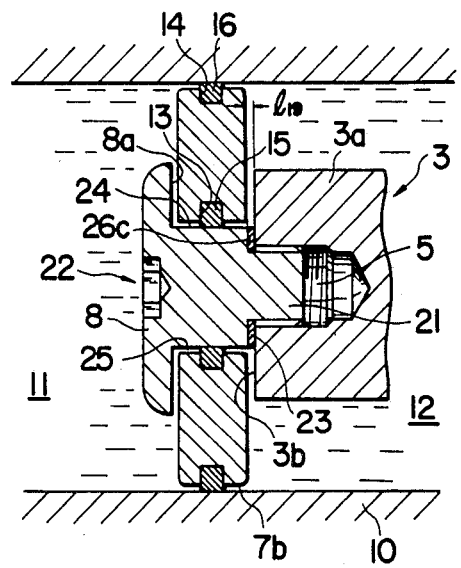

FIGS. 5 through 7 show examples of mechanisms for adjusting during assembly the axial dimension of the annular groove in which the piston is retained.

Specifically, FIG. 5 shows an example in which an annular shim 26A seats on the seating surface 8a of the bolt head 8 of the bolt 22. FIG. 6 shows another example in which an annular shim 26B is disposed on the end face 3b of the rack 3 but not between the step 23 and the end face 3b. FIG. 7 shows still another example in which an annular shim 26C rests on the step 23 of the bolt 22. An annular shim 26C is disposed in this manner on one of the members defining the annular groove 25, the thickness $l_{19}$ of the annular shim 26A, 26B, or 26C serves to cancel any axial dimensional errors resulting commonly from the machining of the axial width $l_3$ of the piston 7 and/or the length of the shoulder 24 of the bolt 22.

Figure 8:
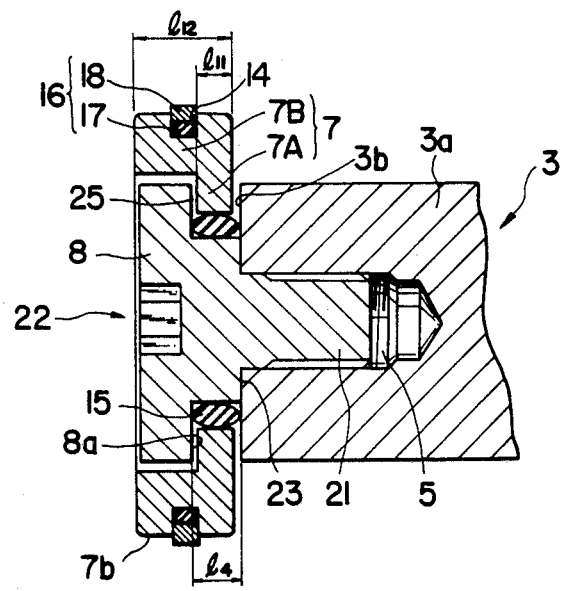
FIG. 8 is an enlarged sectional view of another preferred embodiment according to the present invention.

FIG. 8 shows the major part of another preferred embodiment according to the present invention.

In this embodiment, the piston 7 comprises an insert block 7A received in the annular groove 25 with some axial clearance, and an annular block 7B with a larger width in the axial dimension $l_{12}$ than the axial width $l_{11}$ of the insert block 7A. It should be noted that the dimension $l_4$ between the seating surface 8a of the bolt head 8 and the step 23 is chosen to be slightly greater than the width of the annular sealing member 15 disposed between the insert block 7A and shoulder 24 of the bolt 22. In this embodiment, the sealing groove 13 provided in the embodiment shown in FIGS. 3 and 4 can be omitted. Hence, production costs can be reduced accordingly. Since the axial width $l_{12}$ of the annular groove 7B is greater than the width $l_{11}$ of the insert block 7A, a sealing groove 14 of constant width can be formed around the outer peripheral surface 7b of the piston 7 as in preceding embodiments.

As described hereinabove, since in the rack-and-pinion steering gear structure according to the present invention, the bolt having a shoulder between its head and its threaded portion is screwed into the end of the rack so that an annular groove is formed by the shoulder of the bolt, the seating surface of the bolt head, and the end face of the rack and that the annular piston is elastically retained within the annular groove, the piston can be mounted on the rack without mechanical adaptation of the rack itself. Furthermore, since in the steering gear structure according to the present invention, the step is provided between the shoulder and the threaded portion of the bolt to limit the depth to which the bolt can be screwed into the end of the rack the axial width of the annular groove can be set quickly and accurately.

It will be understood by those skilled in the art that the foregoing description is made in terms of preferred embodiments and various changes and modifications may be made without departing from the scope and spirit of the present invention, which is to be defined by the appended claims.

What is claimed is:

1. A rack-and-pinion steering gear structure, comprising:
   (a) a rack housed in a fluid-filled cylinder and driven by means of a pinion shaft linked to a steering wheel;
   (b) a bolt having a threaded portion screwed into a threaded hole in one end surface of said rack, a head, and a straight bolt shaft integral with said head and threaded portion to limit the depth to which said bolt can be screwed into the end of said rack, said bolt shaft being smaller in diameter than both said rack and said bolt head but greater in diameter than said threaded portion; and (c) a single substantially annular piston member housed within the cylinder and elastically retained within a groove formed and defined by said bolt shaft, said head and said end surface of said rack having small clearances axially and radially so as to retain said piston member with respect to said rack floatingly.

2. The steering gear structure of claim 1, wherein the axial length of said shaft is greater than the axial width of the piston member and including means associated with said piston member and said groove in said rack for cancelling any dimensional errors resulting from preparation of the axial width of said piston member.

3. The steering gear structure of claim 2, wherein said associated means includes annular block means.

4. The steering gear structure of claim 2, wherein said associated means includes an annular skim seating onto a portion of said bolt.

5. The steering gear structure of claim 1, which further comprises an elastic sealing member interposed between the inner periphery of the piston member and the shaft of the bolt.

6. The steering gear structure of claim 1, wherein the piston member has a constant axial dimension.

7. The steering gear structure of claim 5, wherein said piston member comprises an insert block received in the annular groove direction and a substantially annular block disposed radially outside of the groove and having a larger axial dimension than the insert block.

8. The steering gear structure of claim 7, wherein said sealing member is an annular sealing ring.

9. The steering gear structure of claim 5, wherein said sealing member is retained by a substantially annular sealing groove formed in the inner periphery of the piston member.

10. The steering gear structure of claim 9, wherein said sealing member comprises an inner sealing ring in contact with the other periphery of the bolt shaft and an elastic sealing ring encircling the inner seal ring.

11. The steering gear structure of claim 9, wherein said sealing member is an annular sealing ring.

12. A steering gear structure including a rack housed in a fluid-filled cylinder and driven by means of a pinion shaft linked to a steering wheel, comprising:

(a) an end face of the rack oriented substantially perpendicular to the axis of the cylinder and having a central hole lying along said axis;

(b) a first member having a first part fitting into the hole for engaging said end face, a second cylindrical part integral to the first part, greater in diameter than the first part and coaxial with the cylinder, and a third part integral to the second part having a surface parallel to and directly opposing said end face; and (c) a second member elastically retained between the inner wall of the cylinder and the outer surface of the second part of the first member for partitioning the cylinder into two.

13. The steering gear structure of claim 12, wherein known clearances are present between surfaces of the second and third parts of the first member and opposing surfaces of the second member.

14. The steering gear structure of claim 12, which further comprises at least one elastic member mounted on the outer surface of the second member for flexibly engaging the second member to the inner wall of the cylinder and another elastic member mounted on the inner surface of the second member for flexibly engaging the second member to the outer surface of the second part of the first member.

15. The steering gear structure of claim 13, which further comprises a third member attached to one of the second and third parts of the first member and said end face for adjusting the axial clearance between said third part and the second member.

16. The steering gear structure of claim 15, wherein said third member is a shim.

17. The steering gear structure of claim 12, wherein said second member comprises a first block received between the end face of the rack and the opposing surface of the third part of the second member and a second block which is attached to the first block and opposing the third part of the first member with a known clearance therebetween.

18. The steering gear structure of claim 12, wherein said first member comprises a bolt having a shoulder located between a seating face of its bolt head and threaded portion and which is larger in outer diameter than the threaded portion but smaller than the seating face and wherein said central hole located on the end of the rack is threaded for mating with the threaded portion of said bolt.

19. The steering gear structure of claim 12, wherein said second member is a substantially annular piston member.

20. A method for assemblying a piston on an end of a rack of a rack-and-pinion steering gear structure comprising the steps of:

(a) screwing a bolt having a shoulder between seating face of its head and threaded portion into a central hole lying vertical to the planar end of the rack together with the piston elastically lied on the outer periphery of the shoulder.

* * * * *